Dec. 13, 1960 T. M. McCALL 2,964,100
SEAT BELT RETRACTING DEVICE
Filed Sept. 27, 1956 4 Sheets-Sheet 1
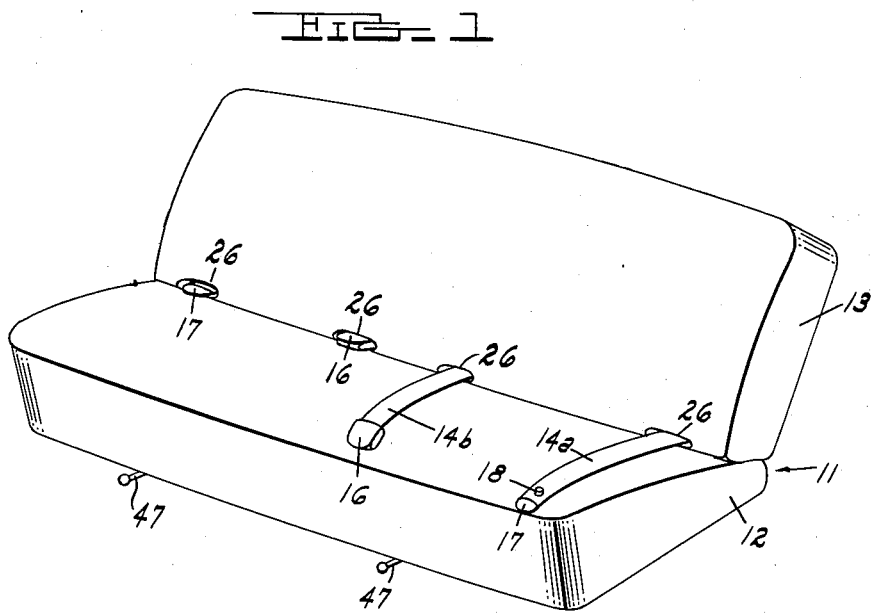
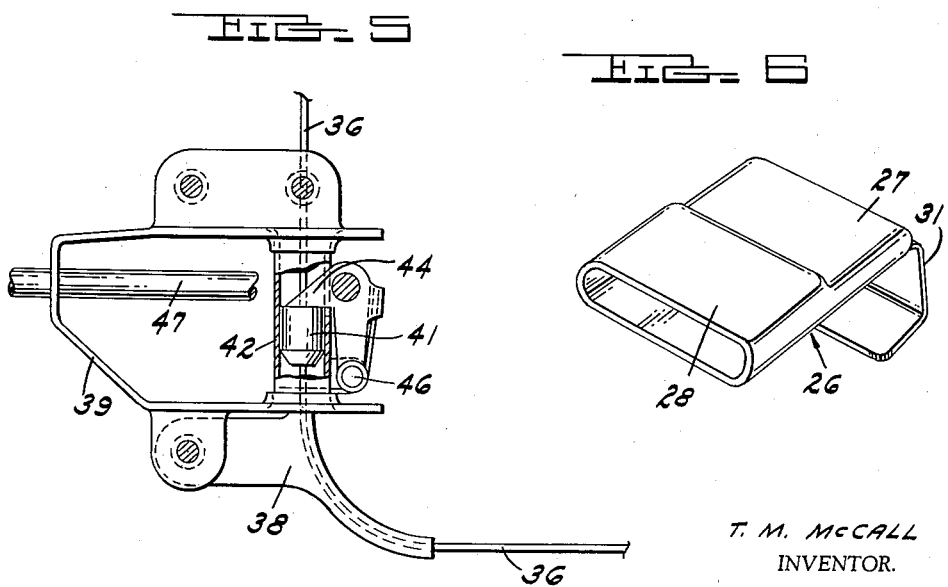
T. M. McCALL
INVENTOR.
E. C. McRAE
BY J. R. FAULKNER
T. H. OSTER
ATTORNEYS

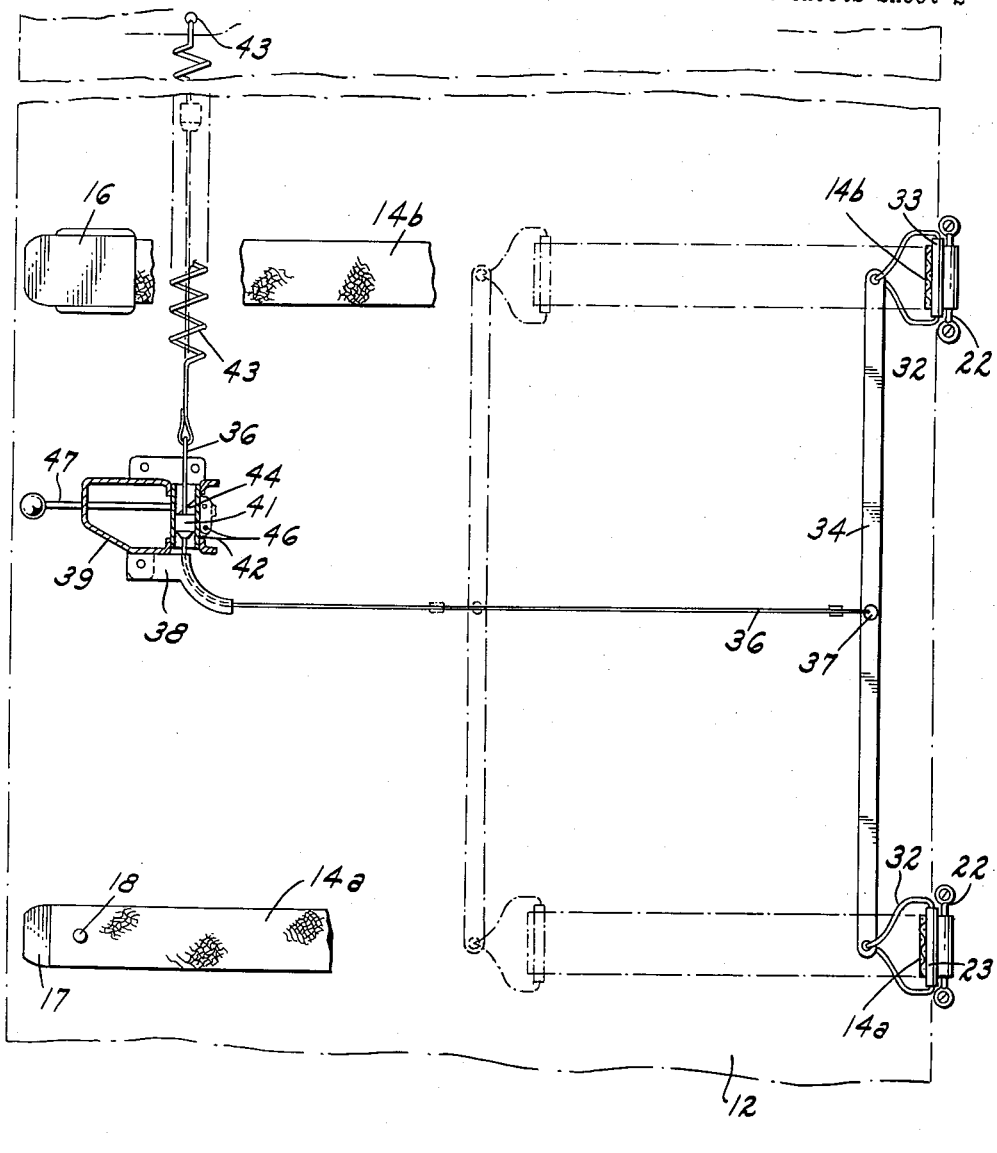

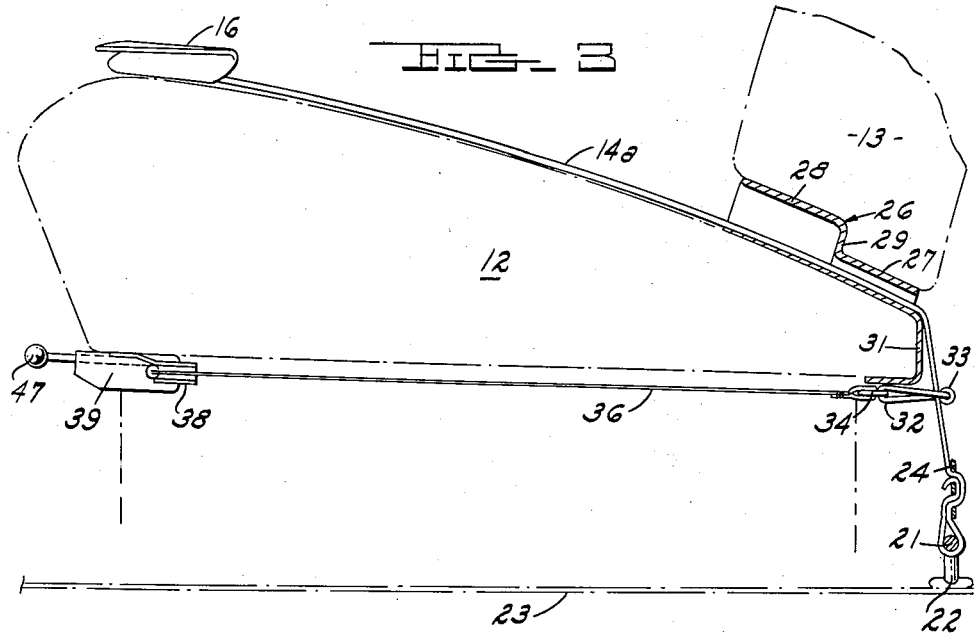
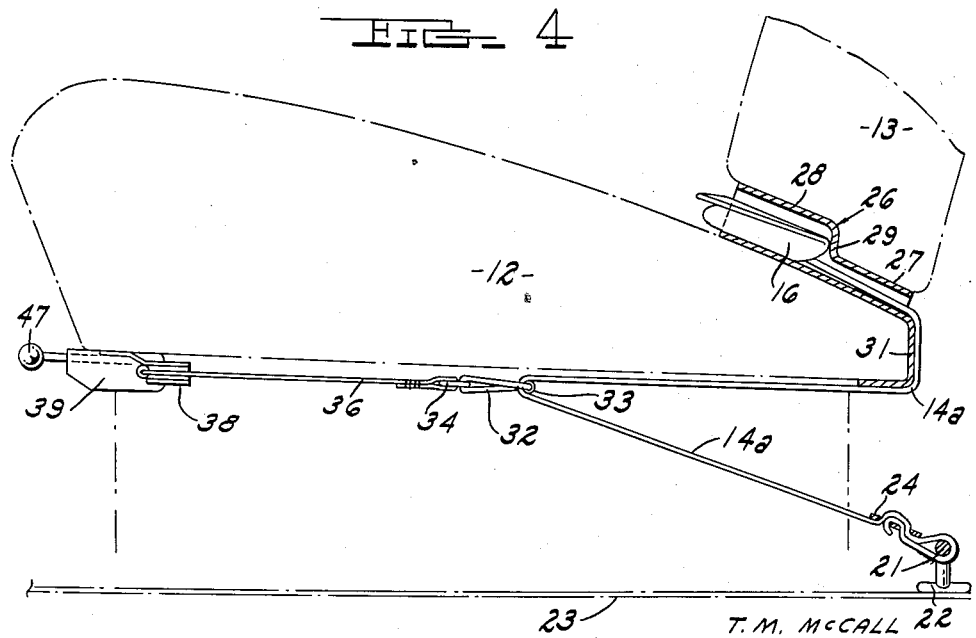

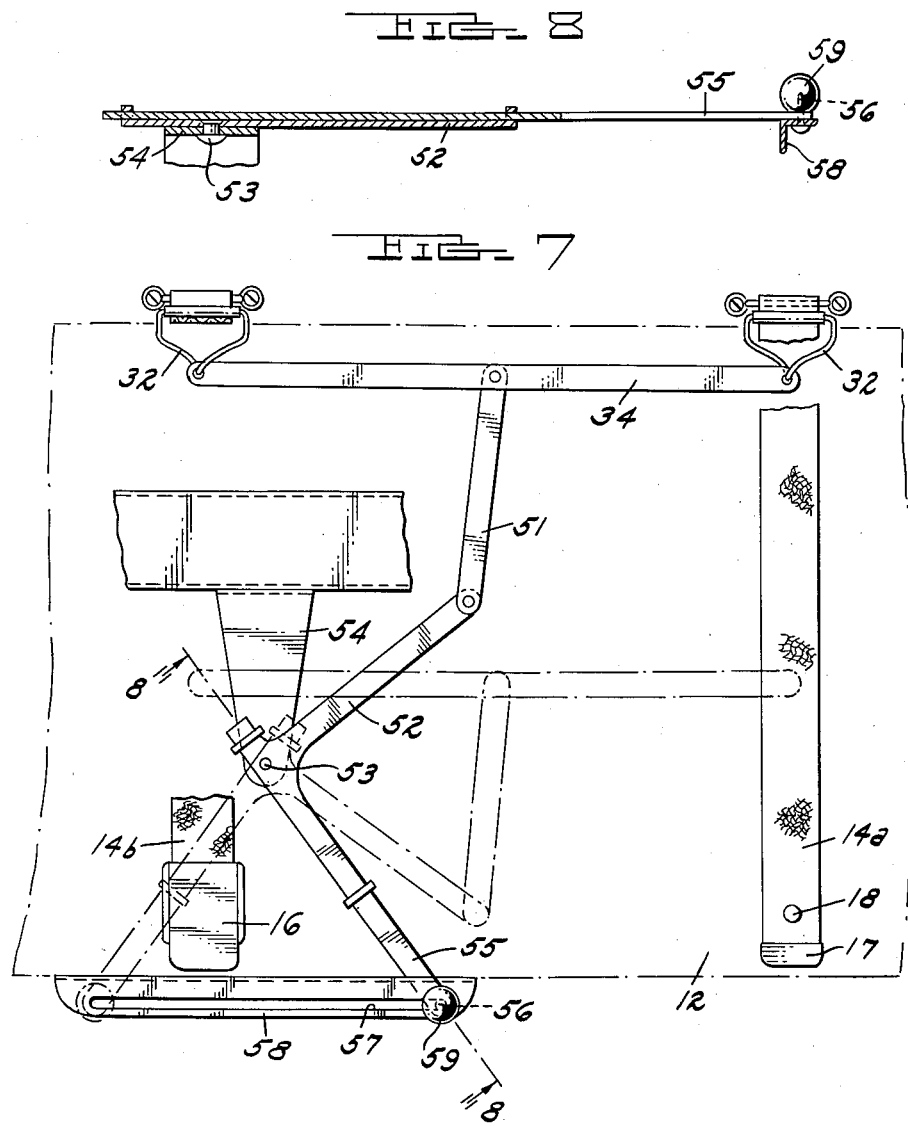

United States Patent Office 2,964,100
Patented Dec. 13, 1960

2,964,100

SEAT BELT RETRACTING DEVICE

Thomas M. McCall, Farmington, Mich., assignor to Ford Motor Company, Dearborn, Mich., a corporation of Delaware Filed Sept. 27, 1956, Ser. No. 612,458

5 Claims. (Cl. 155—189)

This invention relates generally to retracting devices for vehicle seat belts.

An object of the present invention is to provide mechanism for retracting a vehicle seat belt from its operative position overlying the seat cushion to an inoperative position concealed beneath the seat cushion.

A further object of the invention is to provide a seat belt retracting device in which the two sections of the seat belt are simultaneously retracted by mechanism automatically operable upon the manual release of a latch, and in which equalizing means are employed between the two seat belt sections.

Still another object of the invention is to provide a seat belt retracting device which requires a minimum of space beneath the seat cushion and which does not interfere with the normal use of the seat belt.

Other objects and advantages of this invention will be made more apparent as this description proceeds, particularly when considered in connection with the accompanying drawings, wherein:

Figure 1 is a perspective view of a motor vehicle seat incorporating the present invention.

Figure 2 is an enlarged semidiagrammatic plan view of the mechanism shown in Figure 1.

Figure 3 is a side elevational view, partly broken away and in section, of the structure shown in Figure 2 with the seat belt in its extended operative position.

Figure 4 is a view similar to Figure 3 but showing the seat belt in its retracted position.

Figure 5 is an enlarged plan view, partly broken away and in section, of the latch mechanism.

Figure 6 is a perspective view of a guideway for the seat belt.

Figure 7 is a plan view of a modification.

Figure 8 is a cross sectional view taken on the line 8—8 of Figure 7.

Referring now to the drawings, and particularly to the embodiment of the invention shown in Figures 1 to 6 inclusive, the reference character 11 indicates generally a motor vehicle seat having a seat cushion 12 and a seat back 13. The seat is shown with a pair of seat belts, one shown in an extended position and the other in a retracted position. The seat belt at the left of the seat comprises a pair of seat belt sections 14a and 14b having a buckle 16 attached to the free end of the section 14a and a metal tip 17 attached to the free end of the section 14b. The belt section 14b in addition has a raised button 18 secured thereto for a purpose to be described more in detail hereinafter.

As best shown in Figures 3 and 4, the opposite end of each belt section is looped around the upper bar 21 of an anchor bracket 22 suitably secured to the vehicle floor panel 23. An adjusting plate 24 is provided to secure the free end of each belt section to the anchor and also to permit adjustment of its length.

As shown in Figures 3 and 6, each belt section is guided between the seat cushion 12 and the seat back 13 by means of a hollow sheet metal guideway 26. Each guideway 26 is substantially in longitudinal alignment with a respective anchor bracket 22. The guideway has a rearward section 27 accommodating the belt and an enlarged forward section 28 accommodating the buckle 16. The abutment wall 29 formed between the sections 27 and 28 forms a stop limiting rearward movement of the buckle 16 and positioning it in its retracted position with a small portion of the buckle protruding to enable it to be manually grasped to pull the belt to its extended operative position. It will be noted that the bottom wall of the hollow guideway 26 is formed with a downwardly return bent flange 31 protecting the rearward portion of the seat cushion and forming a surface of relatively low friction for the sliding movement of the belt.

A member 32 carrying a roller 33 embraces each of the belt sections 14a and 14b, and the two members 32 are carried at opposite ends of an equalizer bar 34 extending transversely of the vehicle. A flexible cable 36 is connected to a central point 37 of the equalizer bar and extends forwardly therefrom and is passed around an arcuate guide bracket 38 mounted upon the latch bracket 39 carried beneath the vehicle seat cushion 12. A plunger 41 having a beveled nose is secured to the cable 36 and is slidably received within a sleeve 42 carried by the latch bracket 39. A coil spring 43 connects the free end of the cable 36 to the seat frame at the point 43.

In the extended position of the seat belt sections as shown in full lines in Figure 2, the plunger 41 is held against movement under the action of the coil spring 43 by means of a latch 44 pivotally connected to the latch bracket 46. A manually operable control 47 is slidably mounted in the latch bracket 39 and extends forwardly therefrom for manual operation when it is desired to retract the seat belt. When the control 47 is actuated to swing the latch 44 out of holding engagement with the plunger 41, the spring 43 is effective to pull the cable and the equalizer bar 34 forwardly to the position shown in Figure 4, in which the belt sections are retracted to a position beneath the seat cushion and the buckle 16 is housed within the enlarged portion 28 of the guideway 26. The button 18 carried by the free end of the seat belt section 14b is positioned to engage the partition wall 29 of the guideway to similarly position that end of the seat belt within the guideway with only a portion of the tip 17 thereof projecting for manual operation.

To render the seat belt operative the protruding ends of the buckle 16 and belt tip 17 are manually withdrawn to their fully extended positions, automatically retracting the equalizer bar 34 and pulling the cable 36 through the latch bracket until the plunger 41 thereof automatically seats behind the latch 44.

Referring now to the modification of the invention shown in Figures 7 and 8, the equalizer bar 34 connected to the members 32 is connected at its midpoint to a link 51 which in turn is pivotally connected to a bell crank lever 52. The bell crank lever 52 is pivotally mounted at 53 to a bracket 54 connected to the seat frame.

An operating arm 55 is telescopically connected to the forward arm of the bell crank lever 52 and at its forward end carries a pin 56 received within a slot 57 in a bracket 58 extending transversely of the vehicle and supported upon the forward portion of the vehicle seat cushion 12. An operating knob 59 is attached to the pin 56. It will be seen that the equalizer bar 34 can be moved from its operative position in which the seat belt sections are fully extended (as shown in full lines in Figure 7) to the dotted line position shown in Figure 7 in which the seat belt sections are fully retracted by moving the operating knob from the position shown in full lines to the position shown in dotted lines. The telescopic action between the arm 55 and the bell crank lever 52 permits this movement.

It will be understood that the invention is not to be

What is claimed is:

1. In a motor vehicle body, a floor structure, a seat mounted upon said floor structure in such manner as to provide a space therebetween, a seat belt comprising a pair of belt sections, buckle means carried on one end of one of said belt sections receiving one end of the other belt section, spaced guide means located at the upper transverse rear edge of said seat through which the respective belt sections extend toward said floor, spaced anchoring devices located substantially in alignment with each guide means anchoring the other end of each belt section to said floor, a transversely extending bar, means slidably connecting each end of said bar to each seat belt section between the related guide means and anchoring device, and means located beneath said seat operatively connected centrally of said bar and operable to pull said bar beneath said seat away from said anchoring devices into the space between said floor and said seat, said bar when so pulled being effective to simultaneously retract both seat belt sections into said space.

2. In a motor vehicle body, a floor structure, a seat mounted upon said floor structure in such manner as to provide a space therebetween, a seat belt comprising a pair of belt sections, buckle means carried on one end of one of said belt sections receiving one end of the other belt section, spaced guide means located at the upper transverse rear edge of said seat through which the respective belt sections extend toward said floor, spaced anchoring devices located substantially in alignment with each guide means anchoring the other end of each belt section to said floor, a transversely extending bar, means slidably connecting each end of said bar to each seat belt section between the related guide means and anchoring device, and a flexible member connected at its rearward end to the center of said bar, an enlargement at the forward end of said flexible member, a guide bracket slidably receiving said flexible member and said enlargement, spring means acting upon said flexible member, and latch means mounted on said guide bracket engageable with said enlargement to hold said flexible member in a retracted position and releasable to permit movement of said flexible member under the action of said spring means to pull said bar beneath said seat away from said anchoring devices, said bar when so pulled being effective to simultaneously retract both seat belt sections into the space between said floor and said seat, said bar being movable in a substantially horizontal plane.

3. The structure defined by claim 1 which is further characterized in that arcuate guide means are mounted upon said bracket to guide said flexible member, the free end of said flexible member extending transversely of said vehicle and connected at its end to said spring means.

4. In a motor vehicle body, a floor structure, a seat mounted upon said floor structure in such manner as to provide a space therebetween, a seat belt comprising a pair of belt sections, buckle means carried on one end of one of said belt sections receiving one end of the other belt section, spaced guide means located at the upper transverse rear edge of said seat through which the respective belt sections extend toward said floor, spaced anchoring devices located substantially in alignment with each guide means anchoring the other end of each belt section to said floor, a transversely extending bar, means slidably connecting each end of said bar to each seat belt section between the related guide means and anchoring device, a bracket carried by said vehicle seat and located therebeneath, a lever pivotally mounted upon said bracket and having an operable portion extending forwardly therefrom for manual manipulation, and a link interconnecting said lever to the central point of said bar, said lever being operable to pull said bar beneath said seat away from said anchoring devices into the space between said floor and said seat, said bar when so pulled being effective to simultaneously retract both seat belt sections into said space.

5. The structure defined by claim 4 which is further characterized in that said lever comprises a bell crank lever having forwardly and rearwardly extending arms, said rearwardly extending arm being connected to said link, a manually operable member telescopically mounted on said forwardly extending arm, a transverse guideway, and operating means on said member slidably engageable with said guideway.

References Cited in the file of this patent

UNITED STATES PATENTS

| | | |
|---|---|---|
| 2,480,915 | George | Sept. 6, 1949 |
| 2,488,858 | Franz | Nov. 22, 1949 |
| 2,649,145 | McCarthy | Aug. 18, 1953 |
| 2,650,655 | Neahr | Sept. 1, 1953 |
| 2,725,097 | Thoreson | Nov. 29, 1955 |
| 2,798,539 | Johnson | July 9, 1957 |
| 2,814,504 | Campbell | Nov. 26, 1957 |
| 2,830,655 | Lalande | Apr. 15, 1958 |
| 2,861,627 | Smith | Nov. 25, 1958 |

OTHER REFERENCES

"Ford Field"; September 1954 issue, vol. 56, No. 9, pages 16 and 34.